United States Patent [19]

Barrett

[11] 3,983,700

[45] Oct. 5, 1976

[54] FLUID TRANSMISSION

[76] Inventor: George M. Barrett, R.R. No. 5, Galt, Ontario, Canada

[22] Filed: Dec. 20, 1974

[21] Appl. No.: 535,122

[52] U.S. Cl. .................................... 60/445; 60/447; 60/448; 60/449; 60/452; 91/497

[51] Int. Cl.[2] .......................................... F16H 39/46

[58] Field of Search ............. 60/445, 447, 449, 452, 60/487, 488, 448, 451, DIG. 10; 91/497; 417/212, 221

[56] References Cited

UNITED STATES PATENTS

| | | | |
|---|---|---|---|
| 2,161,439 | 6/1939 | Thoma | 60/451 |
| 2,420,806 | 5/1947 | Anderson | 91/497 |
| 2,703,054 | 3/1955 | Heater | 91/498 X |
| 3,054,263 | 9/1962 | Budzich et al. | 60/447 |
| 3,093,946 | 6/1963 | Pitt et al. | 60/452 X |
| 3,107,491 | 10/1963 | Kaup et al. | 60/452 |
| 3,186,170 | 6/1965 | Gauthier et al. | 60/451 |
| 3,199,297 | 8/1965 | Croswhite | 60/449 X |
| 3,521,449 | 7/1970 | Speggiorin | 60/488 |
| 3,796,052 | 3/1974 | Freeman | 60/450 |
| 3,857,326 | 12/1974 | Blandford | 91/497 X |

*Primary Examiner*—Edgar W. Geoghegan
*Attorney, Agent, or Firm*—Diller, Brown, Ramik & Wight

[57] ABSTRACT

This disclosure relates to a fluid transmission for automatically varying the drive ratio in accordance with the load placed thereon and includes a pump unit and a motor unit and wherein the pump unit is of a variable displacement with the displacement thereof being automatically adjustable in accordance with the pressure of the fluid output thereof and the input speed of the pump unit. The pump unit is of the radial piston type and includes a race member engaged by the pistons for controlling the displacement thereof. The race member has a cylindrical race surface and is mounted for tilting movement wherein in a neutral position the pistons have zero displacement and wherein when the race member is tilted, the displacement of the pistons increases.

13 Claims, 8 Drawing Figures

FIG.3
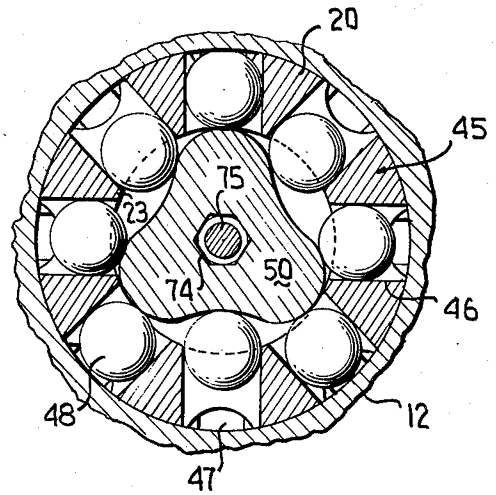
FIG.4
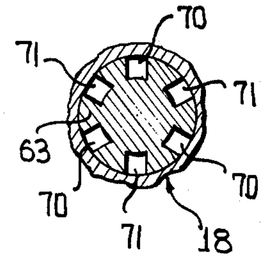
FIG.5
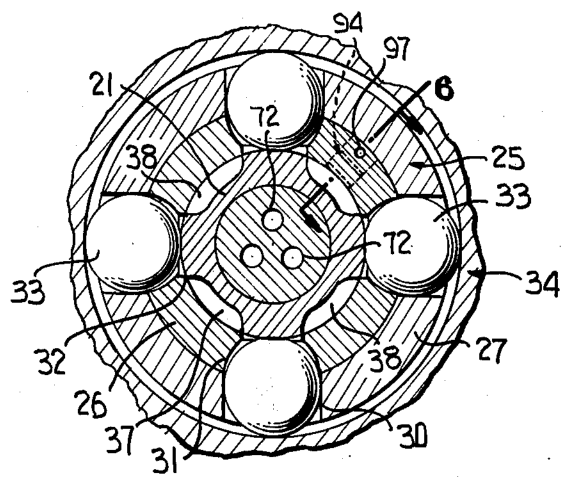
FIG.6
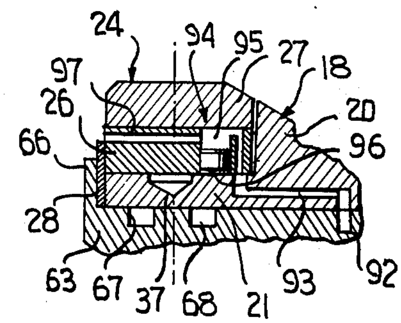
FIG.7
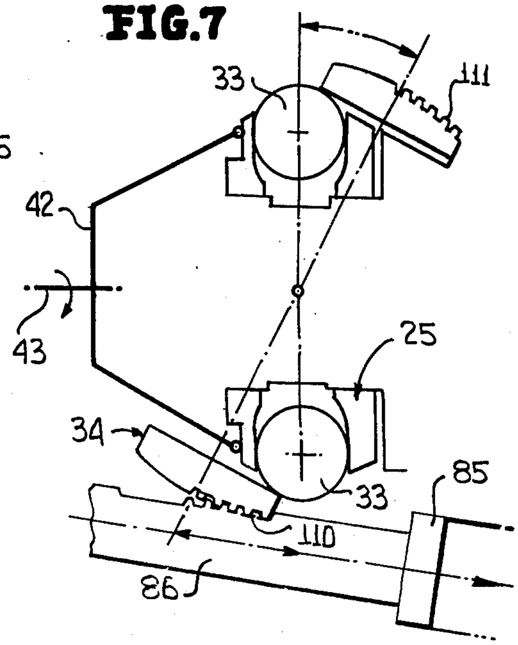
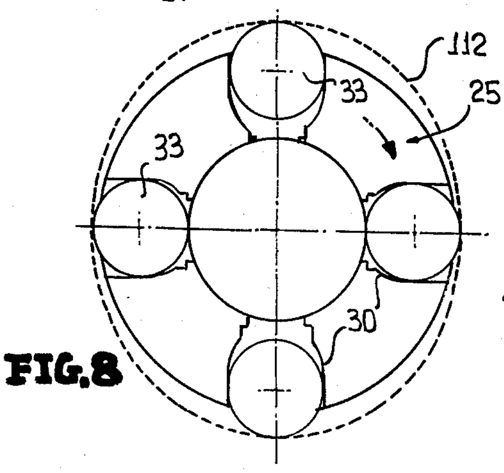
FIG.8

FLUID TRANSMISSION

This invention relates in general to new and useful improvements in transmissions, and more particularly to a novel fluid transmission.

It is well known to provide drive units which include a fluid pump and a motor unit. It is also known that one can control the speed of the motor unit by varying the fluid flow thereto. It is further known that one can control the displacement of a pump unit of the radial piston type by controlling the displacement of the pistons. Notwithstanding this, there is a desire to a fluid transmission which will be satisfactory for coupling a limited horsepower engine to a vehicle drive element without the use of gears, clutches and bands of the type normally utilized in automatic transmissions so as to provide for an automatic variation in the reduction ratio between an input and an output.

In accordance with this invention there is provided a fluid pump which has directly associated therewith a fluid motor. The fluid pump is constructed to be coupled to an input shaft and the fluid motor has an output shaft. The pump unit and the motor unit are disposed in axial alignment immediately adjacent one another and are readily receivable in a small unit caging.

The pump unit is constructed so as to have a displacement which varies from zero to a maximum with the displacement of the pump unit being automatically varied in accordance with the pressure of the output fluid thereof. Thus, the transmission reacts automatically to the load imposed upon the output shaft.

More specifically, the pump unit has a race member which defines a race surface against which the pistons thereof run and which race surface determines the displacement of the pistons. The race surface is cylindrical and when the race member is disposed in a plane normal to the axis of rotation of the pump unit, the piston displacement is zero. When the race member is tilted so that the plane thereof is in angular relation to the axis of rotation of the pump unit, the effective path of movement of the pistons along the race surface is elliptical thereby providing for piston displacement and a pumping action.

A suitable actuator is provided to automatically tilting the race member in response to variations in the pressure of the fluid output of the pump unit and the race member is mounted within the casing for the pump unit so that it may precess during the operation of the pump unit so that the path of piston contact therewith will constantly vary.

With the above and other objects in view that will hereinafter appear, the nature of the invention will be more clearly understood by reference to the following detailed description, the appended claims and the several views illustrated in the accompanying drawings:

IN THE DRAWINGS:

FIG. 3 is a fragmentary transverse sectional view taken through the motor unit and shows the constructional details thereof.

FIG. 4 is a transverse sectional view taken through a rotatable conduit fluidically joining the motor unit to the pump unit.

FIG. 5 is a fragmentary transverse sectional view taken along the line 5—5 of FIG. 1 and shows generally the constructional details of the pump unit.

FIG. 6 is a fragmentary longitudinal sectional view taken along the line 6—6 of FIG. 5 and shows the details of a governor for the transmission.

FIG. 7 is a schematic view showing the race member of the pump unit in a folded tilted maximum displacement position.

FIG. 8 is a schematic view showing the path of piston movement of the pump unit in the maximum displacement position of the race member.

Figure 1:
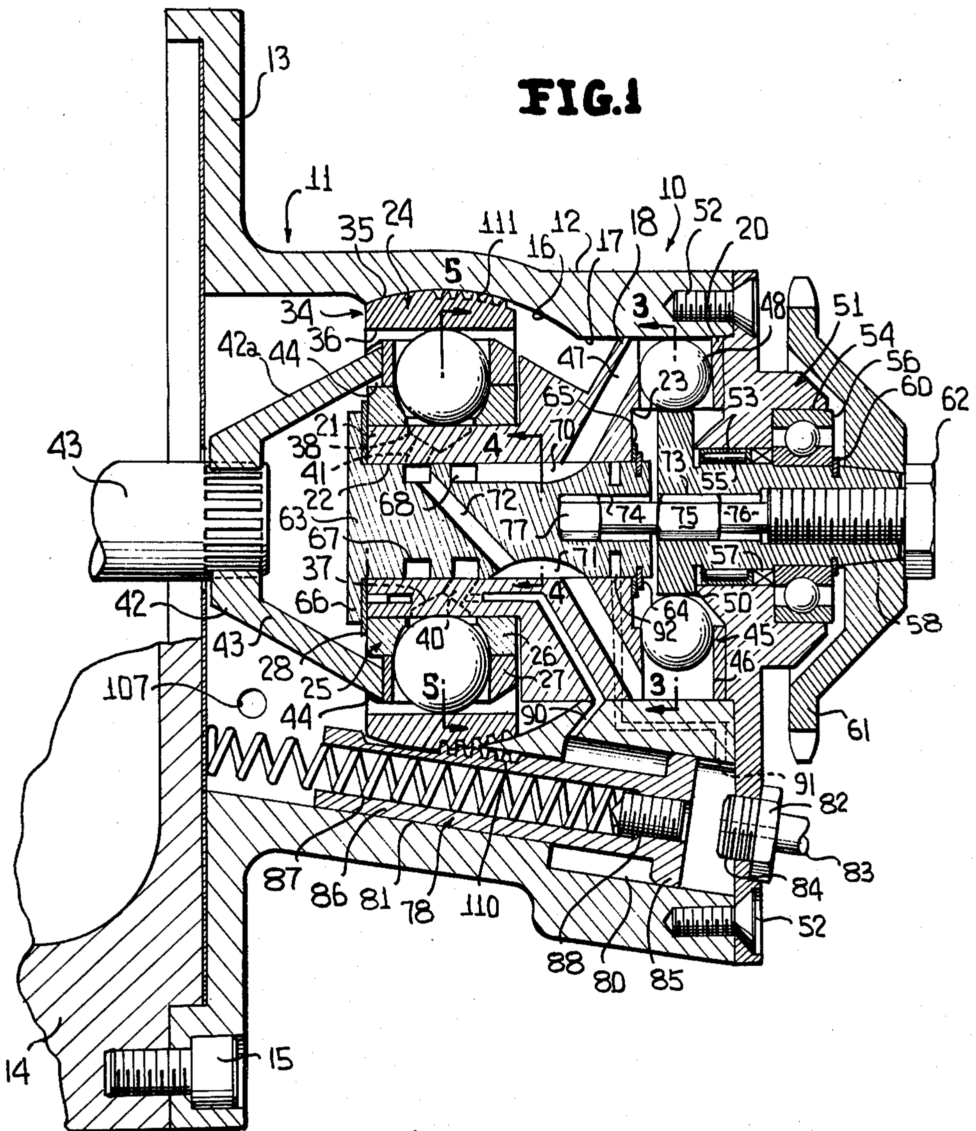
FIG. 1 is a vertical sectional view taken through the fluid transmission and shows generally the details thereof.

Referring now to the drawings to detail, it will be seen that there is illustrated in FIG. 1 the overall structure of the fluid transmission, which fluid transmission is generally identified by the numeral 10. The fluid transmission 10 includes a casing, generally identified by the numeral 11, which casing includes a generally cylindrical body 12 and a mounting flange 13. It is to be noted that the mounting flange 13 is particularly configurated for mounting on a housing 14 of a drive unit, normally an internal combustion engine, and is provided with suitable fasteners 15 for removably securing the casing to the drive unit housing.

The interior of the body 12 is formed with a part spherical surface 16 and with a cylindrical surface 17. A stator 18 has an enlarged diameter portion thereof seated within the cylindrical surface 17 and is preferably bonded in place by suitable adhesive means (not shown). The stator 18 also has a reduced diameter portion 21 thereof which projects axially from the large diameter portion 20 so as to transversely overlap the part spherical surface 16.

The stator 18 has a bore 22 therethrough with the bore including an enlarged portion 23 at the right end thereof within the enlarged portion 20.

The small diameter portion 21 of the stator 18 forms a part of a pump unit, generally identified by the numeral 24. The pump unit 24 includes a rotor which is generally identified by the numeral 25 and which is, for manufacturing convenience, formed of an inner part 26 and an outer part 27 disposed in telescoped relation and suitably secured together for rotation as a unit. It is to be noted that the rotor 25 is mounted for rotation about the reduced diameter part 21 of the stator 18 and is restricted against movement to the right by the enlarged part 20 of the stator. Movement of the rotor 25 to the left is restricted by means of a thrust washer 28 which is held in place in a manner to be described hereinafter.

Referring now to FIG. 5 in particular, it will be seen that the rotor 25 has formed in the outer part thereof a plurality of cylinders 30. While the number of cylinders illustrated in FIG. 5 is four, it is to be understood that any plural number of cylinders may suffice. Each cylinder 30 is provided with an inner end portion 31 which, in turn, terminates in a radially inner port 32. Each cylinder 30 has positioned therein a piston 33 which is preferably in the form of a ball. In the innermost position of each piston 33, the piston will project radially outwardly of the rotor 25.

Returning to FIG. 1, it will be seen that the pump unit 24 also includes an outer race member 34 which has a part spherical outer surface 35 and a cylindrical inner surface 36. The outer surface 35 is of a part spherical configuration and corresponds to the part spherical surface 16 of the casing. Thus, the race member 34 is mounted within the casing 12 for both rotation about the axis of the stator 18 and for tilting about an axis disposed normal to the axis of rotation and intersecting the same, the tilt axis being normal to the plane of FIG. 1. At this time it is pointed out that the part spherical surface 16 has the lower portion thereof omitted so as to facilitate the mounting of the race member 34 within the casing 11.

Referring once again to FIG. 5, it will be seen that the stator portion 21 has formed therein in the same plane as the cylinders 30 two diametrically opposite pressure ports 37. Also formed in that same plane are two more diametrically opposite portions 38 in the stator portion 21 which are 90 degrees out of phase with respect to the ports 37 and are intended to provide a fluid supply to the cylinders 30. Each of the ports 37 has connected thereto a passage 40 which extends through the bore 22 of the stator 18. In a like manner, each of the ports 38 has coupled thereto a passage 41 which extends evenly through the bore of the stator 18 for a purpose to be described in more detail hereinafter.

In order to facilitate the driving of the rotor 25, there is provided a coupler 42 which is splined onto a drive shaft 43 of the power unit 14. The coupler 42 includes leg portions **42*a* which have their ends seated in notches 44 in the facing end of the rotor 25.**

The enlarged portion 20 of the stator 18 forms a portion of a motor unit, generally identified by the numeral 45. As is clearly shown in FIGS. 1 and 3, the stator portion 20 is provided with a plurality of circumferentially spaced, radially extending bores defining cylinders 46. The outer end of the cylinders are closed by the casing body 12 and associated with each of the cylinders 46 in a fluid conduit 47 which extends radially inwardly into the bore 22 in the stator 18, each fluid conduit 47 being generally diagonally disposed, as is best shown in FIG. 1.

Mounted in each of the cylinders 46 for radial movement is a piston 48. Preferably the pistons 48 are also in the form of balls. Positioned within the bore enlargement 23 of the stator portion 20 for rotation is a multi-lobe rotor 50. It will be readily apparent from FIG. 3 that as the pistons 48 are sequentially forced inwardly they drivingly engage the surface of the multi-lobe rotor 50 and effect rotation thereof.

Returning once again to FIG. 1, it will be seen that the right end of the casing 12 is closed by means of an end member, generally identified by the numeral 51, which is removably secured to the body 12 by means of circumferentially spaced fasteners 52. The end member 51 has an inner bore 53 and an outer bore 54. Positioned within the inner bore 53 is an inner bearing 55 which is preferably of the needle roller type. Positioned within the outer bore 54 is a roller bearing 56. Within the inner bore 53 between the bearings 55 and 56 is a seal 57.

A driving or output shaft 58 is rotatably journalled within the bearings 53, 56 and has its inner end integrally connected to the rotor 50. The shaft 58 is retained longitudinally with respect to the casing 11 by the relationship of the rotor 50 with respect to the end member or cap 51 and by an outer snap ring 60. The driving shaft 58 carries a drive pulley 61 or other driving member which is secured to the driving shaft 58 by means of a fastener 62.

Positioned within the bore 22 in the stator 18 is a rotatable conduit member 63. The conduit member 63 is of an external diameter to closely fit within the bore 22 and is retained within the stator 18 against movement to the left by means of a snap ring 64. Between the snap ring 64 and an adjacent portion of the stator 18 is a thrust washer 65.

At the left end of the conduit member 63 is an enlarged flange 66 which overlaps the rotor 25. Between the flange 66 and the left end of the reduced diameter portion 21 of the stator 18 is the previously mentioned thrust washer 28.

The conduit member 63 is provided in the exterior thereof with an annular supply passage 67 into which opens the supply conduits 41 extending to the ports 38. A second annular fluid passage 68 is formed in the exterior of the conduit member 63 in communication with the conduits 40 coupled to the pressure ports 37.

In order that the fluid passages 67 and 68 may be sequentially in communication with the fluid passages 47, and the rotor 50 being a three lobe rotor, there is formed in the outer surface of the conduit member 63 three equally circumferentially spaced, longitudinally extending fluid passages 70 which extend to the right from the fluid passage 68 to the inner ends of the fluid passages 47. There is also formed in the outer surface of the conduit member 63 three circumferentially equally spaced fluid passages 71 which are alternated with the fluid passages 70 and which have their right ends terminating in position for communication with the fluid passages 47. The left end of each fluid passage 71 is placed into communication with the annular fluid passage 67 by means of a diagonal bore 72.

In order that the conduit member 63 may be driven in unison with the rotor 50, there is formed in the rotor and the driving shaft 58 a multi-sided bore 73. A similar bore 74 is formed in the left end of the conduit member 63. A drive shaft 75 extends between the driving shaft 58 and the conduit member 63 and has enlarged ends 76 and 77 seated in the bores 73 and 74, respectively.

In order to automatically position the race member 34, there is provided control means, generally identified by the numeral 78 in the form of a shifter. As is clearly shown in FIG. 1, the lower portion of the casing body 12 is of a thickened construction so as to define a cylinder 80. In communication with the cylinder 80 is a guide bore 81. The outer end of the cylinder 80 is closed by means of a plug 82 having a fluid line 83 connected thereto. The plug 82 has a restricted orifice 84 therethrough.

Mounted within the cylinder 80 is a piston 85 having a tubular rod or stem portion 86. The stem portion 86 is guidingly mounted within the bore 81. Telescoped within the stem 86 is an end portion of a coil spring 87 which projects from the stem 86 and bears against the power unit housing 14. The right end of the spring 87 bears against an adjustable stop 88 carried by the piston 85.

The cylinder 80, to the left of the piston 85, is placed in communication with one of the pressure passages 40 by means of a conduit 90. The right end of the cylinder 80 has in communication therewith another conduit 91 which opens through the bore 22 of the stator 18 in alignment with an annular passage 92 in the conduit member 63. The annular passage 92, as is best shown in FIG. 6, is also in communication with a fluid passage 93 formed in the stator 18.

Formed in the rotor portion 26 is a governor, generally referred to by the numeral 94. The governor 94 includes a radial cylinder 95 in which there is positioned a free floating piston 96. The fluid passage 93 opens into the outer end of the cylinder 95 so that fluid under pressure passing therethrough may act on the outer end of the piston 96 and force the same radially inwardly to the position shown in FIG. 6. Also, formed in the rotor part 26 is a vent passage 97 which extends from the outer portion of the cylinder 95 through a free end of the rotor part 26. It is to be understood that the vent passage 97 is of a larger size than the restricted passage 84.

OPERATION

Figure 2:
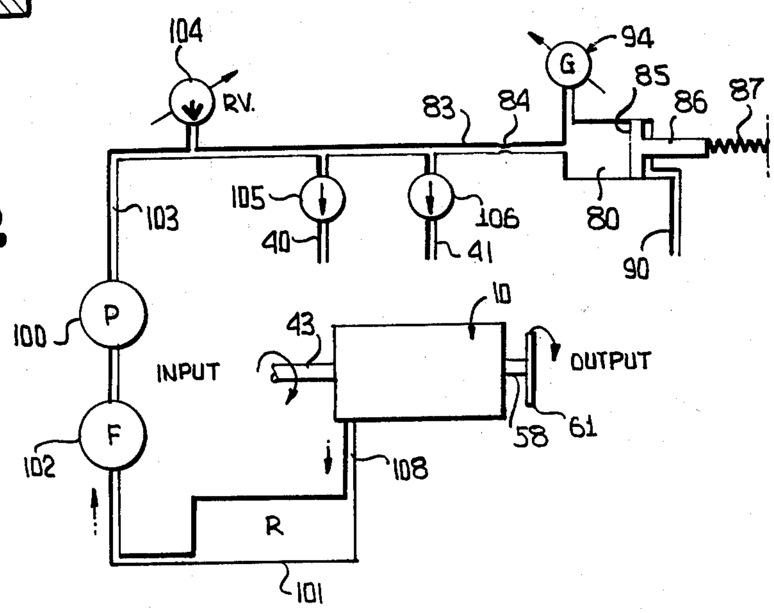
FIG. 2 is a schematic of the hydraulic system of the transmission.

It is to be understood that in the operation of the transmission 10, it will be desirable to precharge the various fluid passages thereof. Further, it is to be understood that there will be a certain fluid loss from within the cylinders and passages which will flow into the casing 11. Accordingly, the transmission 10 will include an external pump which is driven by the power unit 14 and if the power unit 14 is an internal combustion engine of the type requiring a lubrication system, the external pump may be the oil pump of that internal combustion engine. The external pump is identified in FIG. 2 by the reference numeral 100 and receives oil from a reservoir 101 through a filter 102. A supply conduit 103 extending from the pump 100 is preferably provided with an adjustable pressure relief valve 104 so as to control the pressure of fluid entering into the transmission 10. Fluid is pumped into the pressure passages of the transmission through a check valve 105 into, for example, one of the pressure passages 40. In a like manner, fluid is pumped into the lower pressure or return passages of the transmission through a check valve 106 into, for example, one of the fluid passages 41.

Fluid is also pumped into the cylinder 80 through the fluid line 83 and the restricted orifice 84.

Fluid which escapes within the casing 11 may be returned to the reservoir 101 through a drain opening 107 in the casing 11 (FIG. 1) in a drain line 108.

The exterior of the stem 86, as is best shown in FIG. 1, is provided with a gear teeth portion 110 which meshes with circular gear teeth 111 of the race member 34. It will be apparent that through the inter-engagement of the gear segment 110 and the teeth 111, the race member 34 will be positioned by the stem 86.

The spring 87 urges the stem 86 to a position where, when the transmission 11 is inoperative, the plane of the race member 34 corresponds to the plane of the rotor 25. If desired, suitable stop means (not shown) may be provided for limiting the counterclockwise tilting of the race member 34 to the position illustrated in FIG. 1.

When the power unit 14 is operating, the pump 100 has pressurized all of the internal passages of the transmission 11 and additionally has directed fluid under pressure into the right side of the cylinder 80. However, the governor 94, which has a greater capacity than the restricted orifice 84, is constantly venting the right side of the cylinder 80 to the interior of the casing 11. Thus, the piston 85 maintains the position shown in FIG. 1.

In the illustrated position of the race member 34, the path of engagement of the pistons 33 with the race surface 36 is a circular path and there is no displacement of the pistons 33 which are held outwardly by the pressure within the inner ends of the respective cylinders thereof.

As the rotor 25 rotates, centrifugal action on the piston 96 will urge the same outwardly so as to begin to close the vent passage 97 with the result that there will be a pressure build up in the right end of the cylinder 80 proportional to the speed of the pump rotor 25 urging the piston 85 to the left. Movement of the piston 85 to the left will result in the tilting of the race member 34 so that the path traced out by the pistons 33 on the race surface 36 changes from a cylindrical path to an elliptical path as is generally shown in FIG. 8 and is identified by the reference numeral 112. Inasmuch as the pistons are constantly urged outwardly by the pressure of fluid within the supply passages, the pistons 33 in their top and bottom positions are projecting outwardly of the respective cylinders 30 and then are forced radially inwardly so as to produce a pumping action in the pressure ports 37.

As pressure builds up in the pressure ports 37, fluid under pressure is directed through the passage 90 to the left end of the cylinder 80 so as to counterbalance the pressure in the right end of the cylinder 80. Depending upon the load placed upon the driving shaft 58 there will be a build up of pressure within the pressure conduits of the transmission 11 and a shifting of the piston 85 so that the displacement of the pump unit 24 will vary in accordance with the power available from the power unit 14 and the resistance placed upon the driving shaft 58 and the input speed of the power unit 14.

It will be readily apparent that the outer ends of the cylinders 46 are alternately placed under pressure and then in communication with the return passages of the conduit member 63 so that the pistons 48 are sequentially urged radially inwardly so as to effect rotation of the rotor 50 and the driving shaft 58 coupled thereto.

It is to be understood that the pistons 33, while they freely roll on the race surface 36, have a tendency to wear a path in the race surface. However, this same frictional reaction also urges the race member 34 to rotate and because the teeth 111 thereof are annular or circular teeth, notwithstanding the meshing of the teeth 111 with the gear segment 110 on the stem 86, the race member 34 will be free to precess, that is to rotate at a very slow rate, so as to provide an ever changing path of the pistons 33 on the race surface 36. Thus, any wearing of the race surface 36 which may occur will be spread substantially evenly over the entire race surface 36.

Although the pump unit 24 has been specifically illustrated and described in conjunction with the motor unit 45 and as part of the transmission 10, it is to be understood that the variable displacement principle of the pump unit may be employed in other combinations.

Although only a preferred embodiment of the fluid transmission has been specifically illustrated and described herein, it is to be understood that minor variations may be made in the fluid transmission without departing from the spirit and scope of the invention, as defined by the appended claims.

What is claimed is:

1. A fluid transmission comprising a pump unit, means for coupling said pump unit to a drive shaft, a driving shaft, a motor unit coupled to said driving shaft, fluid conduit means between said pump unit and said motor unit; and a single casing mounting said pump unit, said motor unit, said driving shaft and said fluid conduit means, said pump unit including a driven rotor, a plurality of pistons carried by said rotor for rotation therewith, a race member cooperable with said pistons for effecting radial displacement of said pistons in said rotor to produce a pumping action and means for shifting said race member relative to said rotor to vary the displacement of said pistons, said race member having a race surface of a cylindrical configuration, and said means for shifting said race member providing for a neutral race member position wherein a path of movement of said pistons along said race member is circular with zero piston displacement and other race member positions wherein the path of movement of said pistons is oval with a positive piston displacement, said race member having a part spherical outer surface, and said casing having a part spherical seat directly receiving said race member part spherical outer surface to facilitate shifting of said race member.

2. The fluid transmission of claim 1 wherein said means for shifting said race member is directly connected to said race member, and said means for shifting said race member and for mounting said race member permit precession of said race member in response to rotation of said rotor to constantly provide a new line of movement of said pistons on said race member.

3. A fluid transmission comprising a pump unit, means for coupling said pump unit to a drive shaft, a driving shaft, a motor unit coupled to said driving shaft, fluid conduit means between said pump unit and said motor unit; and a single casing mounting said pump unit, said motor unit, said driving shaft and said fluid conduit means, said pump unit including a driven rotor, a plurality of pistons carried by said rotor for rotation therewith, a race member cooperable with said pistons for effecting radial displacement of said pistons in said rotor to produce a pumping action, and means for shifting said race member relative to said rotor to vary the displacement of said pistons, said shifting means including a piston type actuator and fluid pressure means from said pump unit for acting on said actuator and positioning said race member in accordance with the pressure of the fluid output of said unit, and an external control fluid supply independent of said pump coupled to said actuator in opposition to said pump unit fluid output.

4. The fluid transmission of claim 3 wherein there are vent means for said external control fluid supply, and governor means for closing said vent means in response to rotation of said pump means.

5. A fluid transmission comprising a pump unit, means for coupling said pump unit to a drive shaft, a driving shaft, a motor unit coupled to said driving shaft, fluid conduit means between said pump unit and said motor unit; and a single casing mounting said pump unit, said motor unit, said driving shaft and said fluid conduit means, said fluid conduit means including first and second fixed conduits in constant communication with said motor unit and said pump unit, and rotatable conduit means selectively joining said first and second fixed conduits.

6. The fluid transmission of claim 5 wherein conduit means couple said rotatable coupling means to said motor unit for rotation thereby.

7. A variable displacement fluid unit comprising a casing, a rotor mounted for rotation relative to said casing, said rotor having a plurality of radial cylinders, pistons in said cylinders, a race member cooperating with said pistons for controlling the radial movement thereof, said race member having a cylindrical race surface directly engageable by said pistons, mounting means mounting said race member directly in said casing for tilting between a zero piston displacement position coplanar with said cylinders and a maximum piston displacement position wherein the general plane of said race member is in angular relation to the general plane of said rotor, said mounting means mounting said race member for precession whereby the path of said pistons along said race surface is permitted to constantly change and control means directly connected to said race member for selectively tilting said race member.

8. The fluid unit of claim 7 wherein said control means includes a piston type actuator and fluid pressure means from said conduit means for acting on said actuator and positioning said race member in accordance with the fluid pressure within said conduit means, and there is an external control fluid supply separate from said fluid unit coupled to said actuator in opposition to said fluid pressure means.

9. The fluid transmission of claim 1 wherein said race member part spherical outer surface has formed therein circular teeth, and said means for shifting said race member includes a rack engaging said circular teeth thereby providing a positive mechanical connection between said shifting means and said race member while permitting precession of said race member in response to rotation of said rotor to constantly provide a new line of movement of said pistons on said race member.

10. The fluid transmission of claim 1 wherein said casing is integral along said part spherical seat.

11. The fluid unit of claim 7 wherein said mounting means include complementary part spherical surface portions on said race member and said casing.

12. The fluid unit of claim 11 wherein said casing is integral along said part spherical portion.

13. The fluid unit of claim 7 wherein said race member part spherical portion has formed therein circular teeth, and said means for shifting said race member includes a rack engaging said circular teeth thereby providing a positive mechanical connection between said shifting means and said race member while permitting precession of said race member in response to rotation of said rotor to constantly provide a new line of movement of said pistons on said race member.

* * * * *